(12) United States Patent
Lan

(10) Patent No.: US 6,318,750 B1
(45) Date of Patent: Nov. 20, 2001

(54) SHOCK ABSORBING DEVICE FOR A STROLLER

(76) Inventor: Red Lan, 15F, No. 108, Sec. 1, Hsin-Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 09/676,212

(22) Filed: Sep. 29, 2000

(51) Int. Cl.[7] ........................................................ B62B 1/00
(52) U.S. Cl. ............................................... 280/642; 267/5
(58) Field of Search .................................. 280/20, 47.38, 280/62, 642, 694, 647, 650, 283; 267/563.1, 153, 229; 16/35 R, 44

(56) References Cited

U.S. PATENT DOCUMENTS 4,491,335 * 1/1985 Evron ................................. 280/47.41
5,301,931 * 4/1994 Bigo ........................................ 267/5

* cited by examiner

Primary Examiner—Christopher P. Schwartz
Assistant Examiner—C. T. Bartl
(74) Attorney, Agent, or Firm—Ladas & Parry

(57) ABSTRACT

A shock absorbing device is adapted for damping impact transmitted from a front wheel of a stroller. The device includes left and right lever members, left and right front leg members, a pair of coupling members, and a pair of biasing members. Each lever member has an anchoring end adapted to be secured to one end of a front wheel axle, and is pivotally mounted on the coupling member. Each front leg member has one end connected to a seat frame of the stroller, and the other end retained in the corresponding coupling member. The biasing members are disposed to bias engaged ends of the front leg members to move towards or away from intermediate portions of the lever members when tensioned or compressed.

7 Claims, 7 Drawing Sheets

SHOCK ABSORBING DEVICE FOR A STROLLER

BACKGROUND OF THE INVENTION

1. Field of the Invention

The invention relates to a shock absorbing device for a stroller, more particularly to a shock absorbing device for damping impact transmitted from the front wheel of a three-wheeled stroller.

2. Description of the Related Art

Strollers equipped with a shock absorbing device for damping impact transmitted from the rear wheels thereof are known in the art. With reference to FIG. 1, a conventional three-wheeled stroller 1 is shown to include a frame 11, a front wheel 12 mounted on a front wheel axle 121 and connected to front legs 111 of the frame 11, and a pair of rear wheels 13 mounted at a rear end of the frame 11. For the sake of comfort, two shock absorbing devices 14 are disposed on the frame 11 above the rear wheels 13.

To enhance comfort, there is a need for a shock absorbing device that absorbs the impact transmitted from the front wheel of the stroller.

SUMMARY OF THE INVENTION

Therefore, the main object of the present invention is to provide a shock absorbing device for a stroller that damps impact transmitted from the front wheel of the stroller.

Accordingly, a shock absorbing device of the present invention is adapted for damping impact transmitted from a front wheel of a stroller which further includes a seat frame, a rear wheel axle, a pair of rear legs, and a front wheel axle. The seat frame has front and rear sides opposite to each other in a longitudinal direction, each of the front and rear sides having left and right ends opposite to each other in a first transverse direction relative to the longitudinal direction. The rear wheel axle is disposed transverse to the longitudinal direction, and has two lateral ends provided with two rear wheels which are rotatable about a first axis parallel to the rear wheel axle. The rear legs are each disposed to interconnect a respective one of the two lateral ends and a respective one of the left and right ends of the rear side. The front wheel axle has two anchored ends and defines a second axis parallel to the first axis. The front wheel is mounted on the front wheel axle and is rotatable about the second axis. The shock absorbing device includes left and right lever members, left and right front leg members, a pair of coupling members, and a pair of biasing members. Each of the left and right lever members includes an anchoring end adapted to be secured to a respective one of the two anchored ends, an intermediate portion extending rearwardly and upwardly from the anchoring end so as to form an upward surface, and a weight end extending from the intermediate portion towards the seat frame. Each of the left and right front leg members includes an upper end adapted to be connected to a respective one of the left and right ends of the front side, a middle portion extending forwardly and downwardly from the upper end so as to form a downward surface which faces the upward surface of a respective one of the left and right lever members in a second transverse direction, and an engaged end extending from the middle portion towards the front wheel axle. Each of the coupling members includes a mounting wall extending in the second transverse direction for positioning the engaged end of a respective one of the left and right front leg members, and a pivoting pin disposed on the mounting wall with a pivoting axis transverse to the second transverse direction for mounting pivotally the intermediate portion of a respective one of the left and right lever members at a fulcrum proximate to the weight end such that a part of the intermediate portion proximate to the anchoring end is spaced apart from the engaged end in the second transverse direction. Each of the biasing members is disposed to bias the engaged end of a respective one of the left and right front leg members to move towards or away from the intermediate portion of a respective one of the left and right lever members in the second transverse direction when tensioned or compressed.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
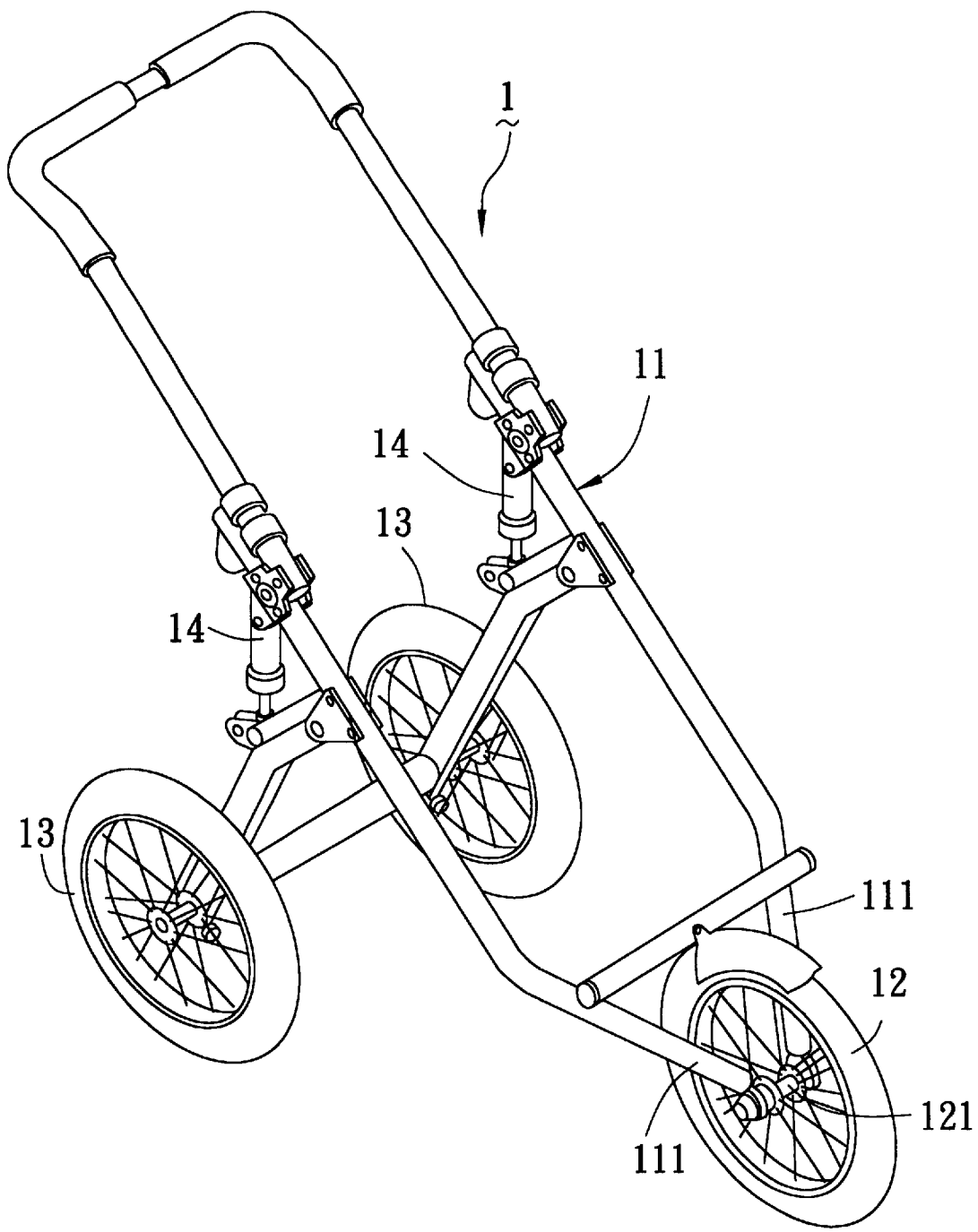
FIG. 1 is a perspective view of a conventional three-wheeled stroller having two rear wheel shock absorbing devices.
Figure 2:
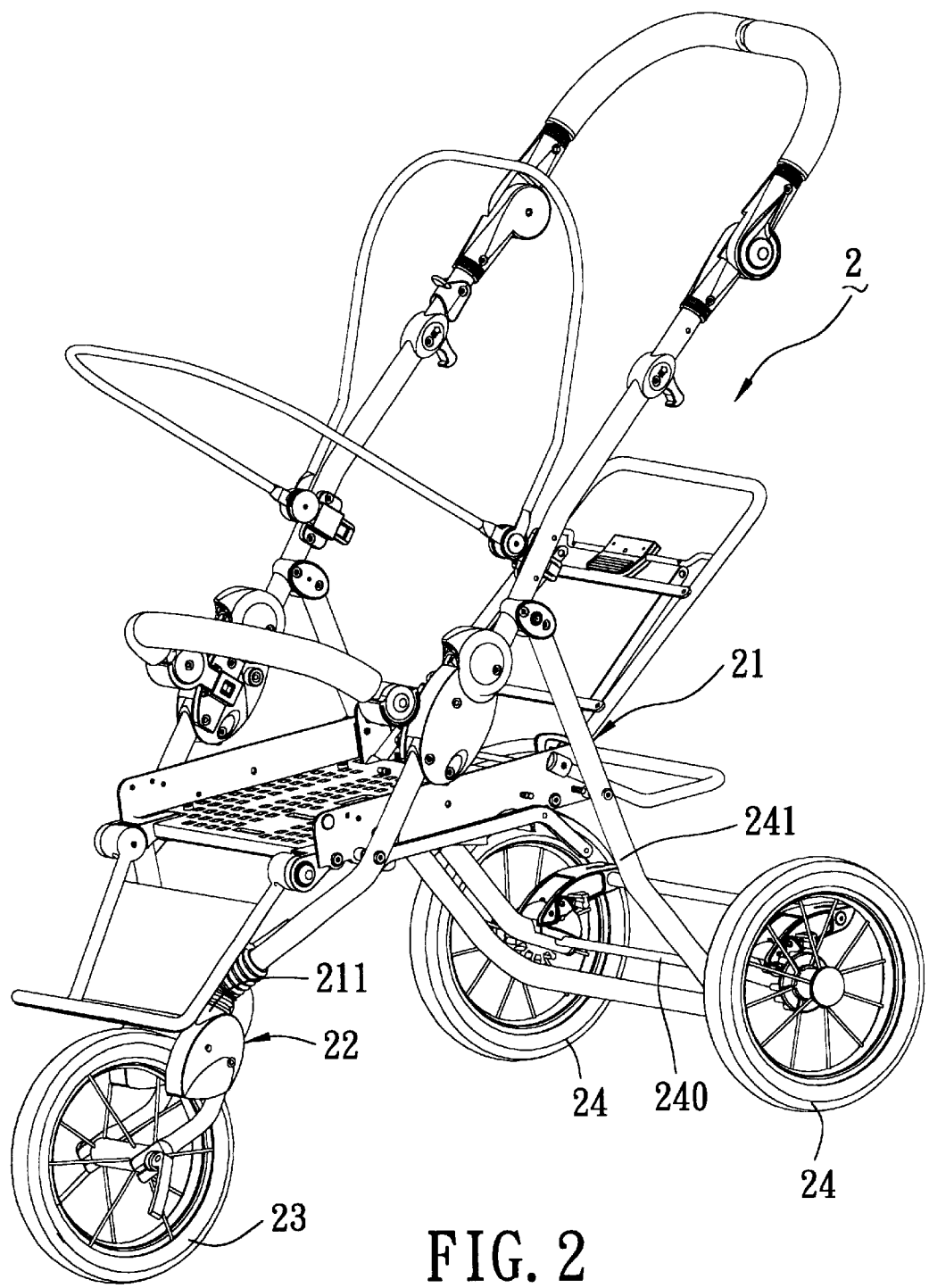
FIG. 2 is a perspective view of a stroller embodying the preferred embodiment of a shock absorbing device according to the invention.
Figure 3:
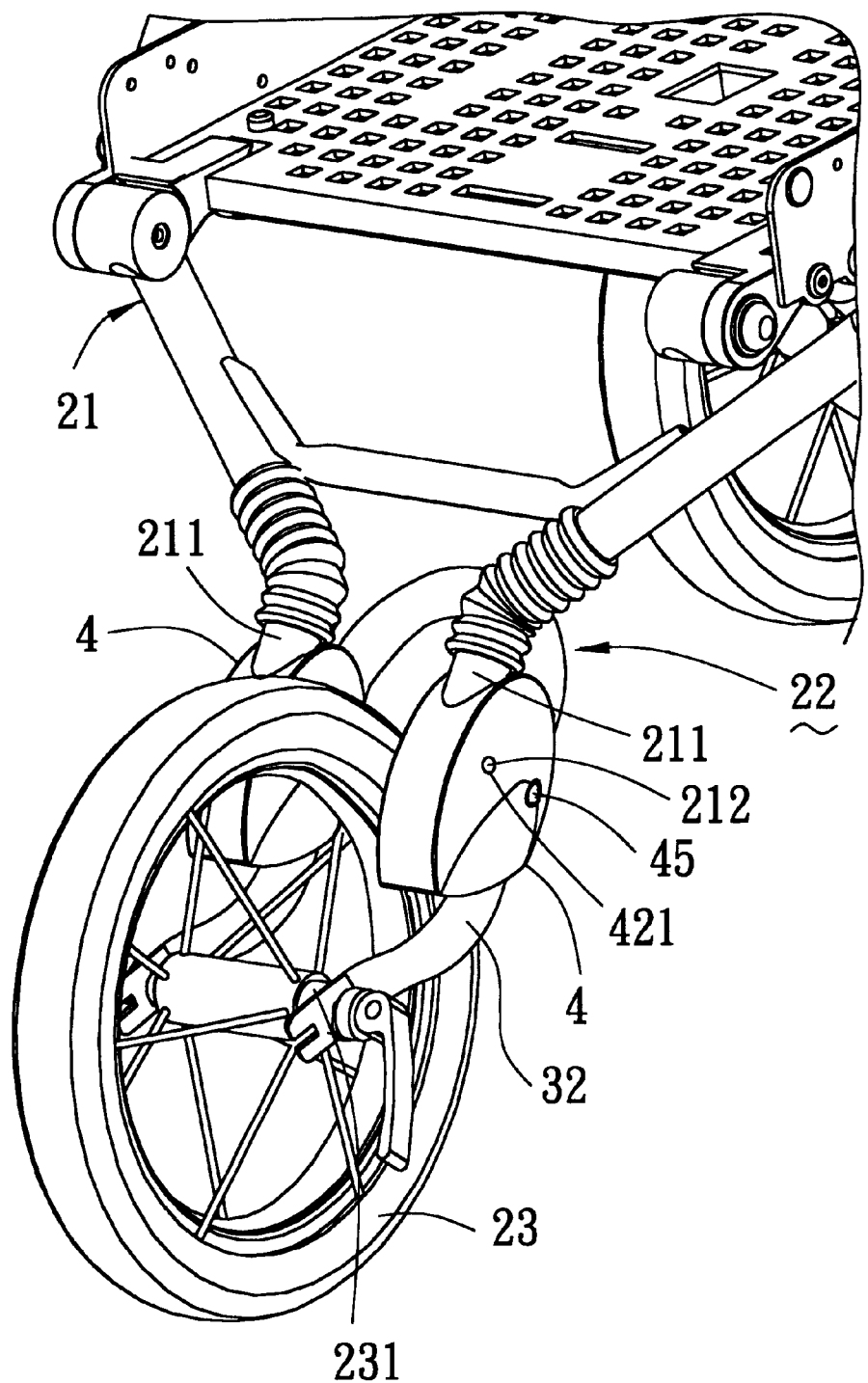
FIG. 3 is a fragmentary perspective view of the preferred embodiment adapted for use on the front wheel of the stroller.
Figure 4:
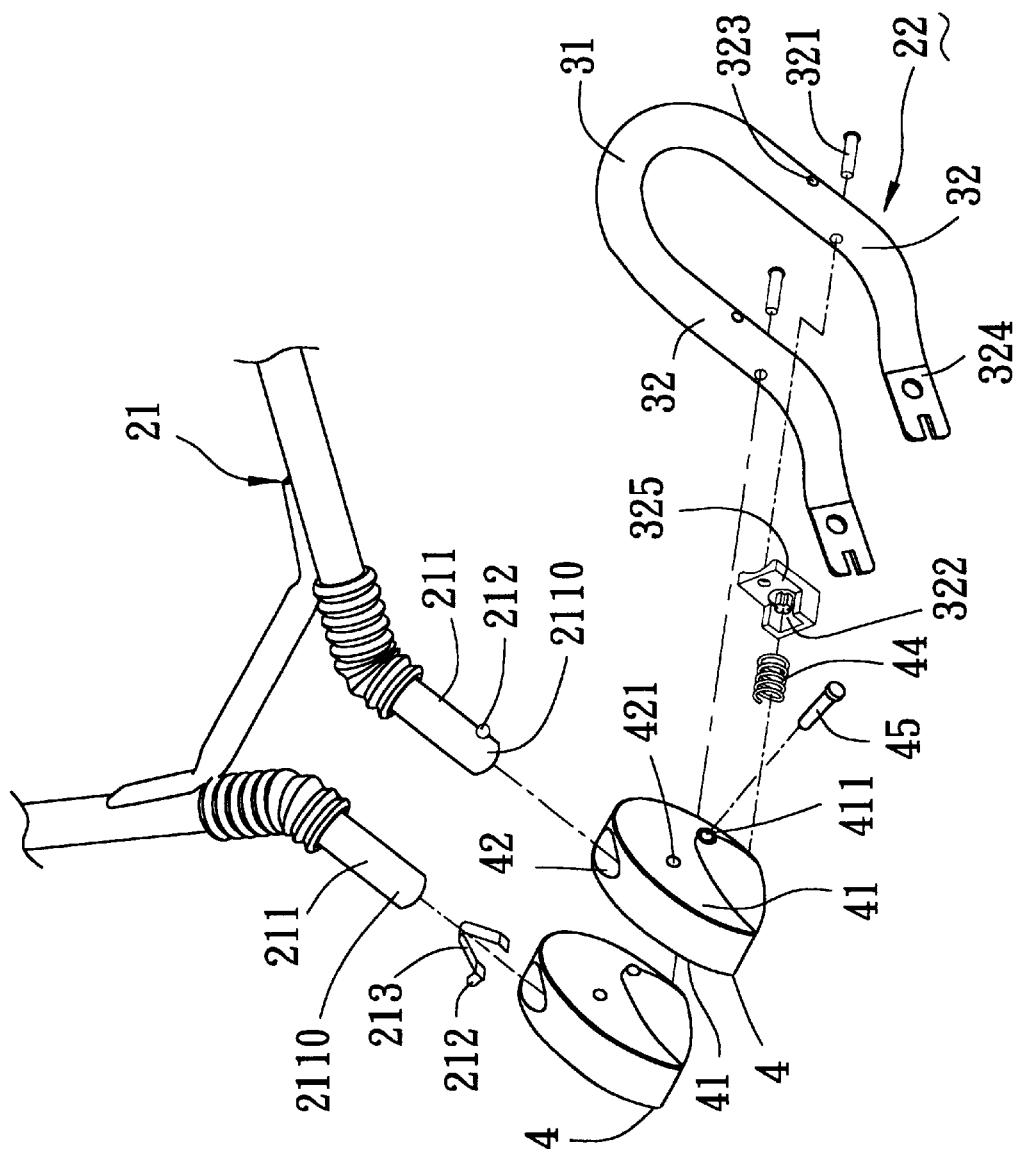
FIG. 4 is an exploded perspective view of the preferred embodiment.
Figure 5:
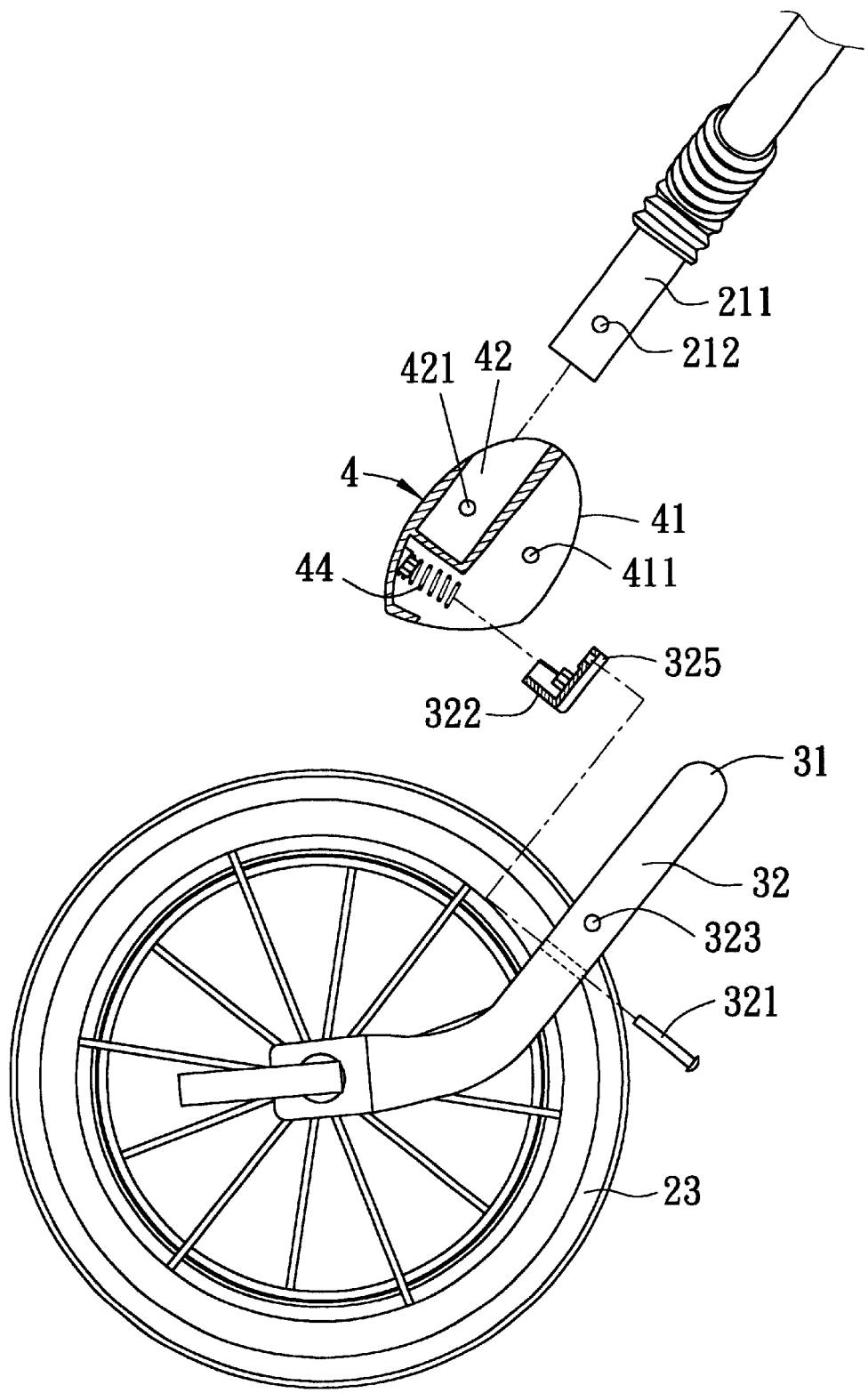
FIG. 5 is a partly exploded sectional view of the preferred embodiment adapted for use on the front wheel of the stroller.

Referring to FIGS. 2 and 3, the preferred embodiment of a shock absorbing device 22 according to the present invention is adapted for damping impact transmitted from a front wheel 23 of a stroller 2. The stroller 2 includes a seat frame 21 having front and rear sides opposite to each other in a longitudinal direction. Each of the front and rear sides has left and right ends opposite to each other in a first transverse direction relative to the longitudinal direction. A rear wheel axle 240 is disposed transverse to the longitudinal direction, and has two lateral ends provided with two rear wheels 24, which are rotatable about a first axis parallel to the rear wheel axle 240. A pair of rear legs 241 are disposed to interconnect a respective one of the two lateral ends and a respective one of the left and right ends of the rear side. The front wheel 23 is mounted on a front wheel axle 231 having two anchored ends and defining a second axis parallel to the first axis, and is rotatable about the second axis.

With reference to FIGS. 3 to 7, the shock absorbing device 22 is shown to include left and right lever members 32, left and right front leg members 211, a pair of coupling members 4, and a pair of biasing members 44. Each of the left and right lever members 32 includes an anchoring end 324 adapted to be secured to a respective one of the two anchored ends, an intermediate portion extending rearwardly and upwardly from the anchoring end 324 so as to form an upward surface, and a weight end extending from the intermediate portion towards the seat frame 21. A cross bar 31 is disposed transversely to interconnect and is formed integrally with the weight ends of the left and right lever members 32. The left and right lever members 32 are hollow tubular members with the anchoring ends 324 formed as flat ends.

Each of the left and right front leg members 211 includes an upper end adapted to be connected to a respective one of the left and right ends of the front side, a middle portion extending forwardly and downwardly from the upper end so as to form a downward surface which faces the upward surface of a respective one of the lever members 32 in a second transverse direction, and an engaged end 2110 extending from the middle portion towards the front wheel axle 231. The weight end of a respective one of the lever members 32 is disposed under the middle portion proximate to the upper end so as to be brought to abut against the middle portion when the seat frame 21 is loaded.

Each of the coupling members 4 includes a mounting wall 41 extending in the second transverse direction for positioning the engaged end 2110 of a respective one of the front leg members 211, and a pivoting pin 45 extending through a pivot hole 411 in the mounting wall 41 and a through hole 323 in the intermediate portion of a respective one of the lever members 32 with a pivoting axis transverse to the second transverse direction for mounting pivotally the intermediate portion at a fulcrum proximate to the weight end such that a part of the intermediate portion proximate to the anchoring end 324 is spaced apart from the engaged end 2110 in the second transverse direction. Each of the coupling members 4 includes a socket portion 42 formed with the mounting wall 41 and extending in a third axial direction which is parallel to a third transverse direction relative to the second transverse direction. The socket portion 42 defines a retaining hole 421 extending radially relative to the third axial direction. The engaged end 2110 includes inner and outer surrounding walls radially opposite to each other and extending in the third axial direction. The inner surrounding wall defines an insert hole extending radially to communicate with the outer surrounding wall such that when the engaged end 2110 is positioned by the mounting wall 41, the retaining hole 421 is aligned with the insert hole. The engaged end 2110 further has a spring member 213, preferably a leaf spring, disposed therein to bias a retaining pin 212 to move into the retaining hole 421 when the retaining hole 421 is aligned with the insert hole. The retaining pin 212 may be formed integrally with a rear end of the spring member 213.

Figure 6:
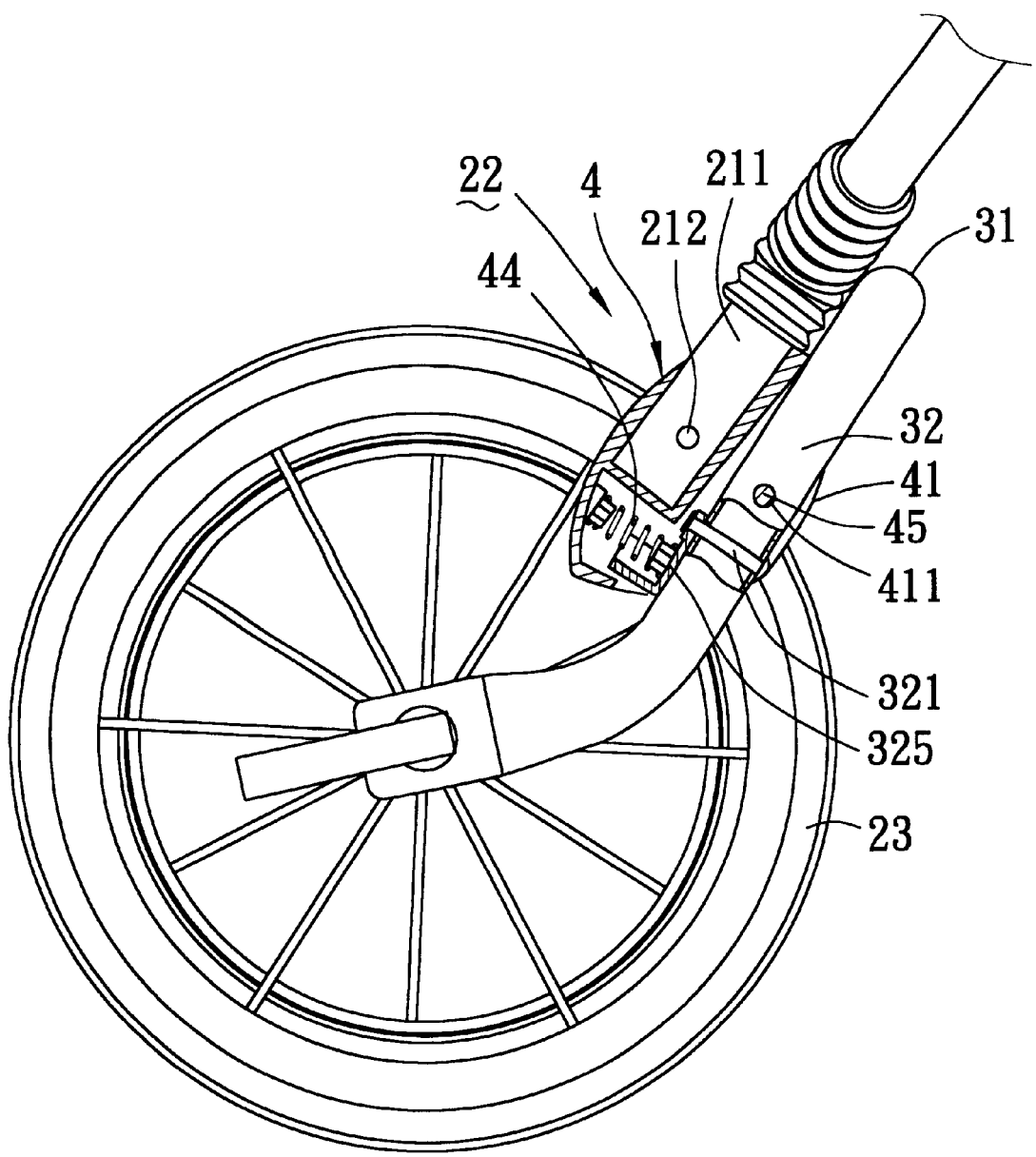
FIG. 6 is an assembled partly sectional schematic side view of the preferred embodiment when no impact is transmitted from the front wheel of the stroller.
Figure 7:
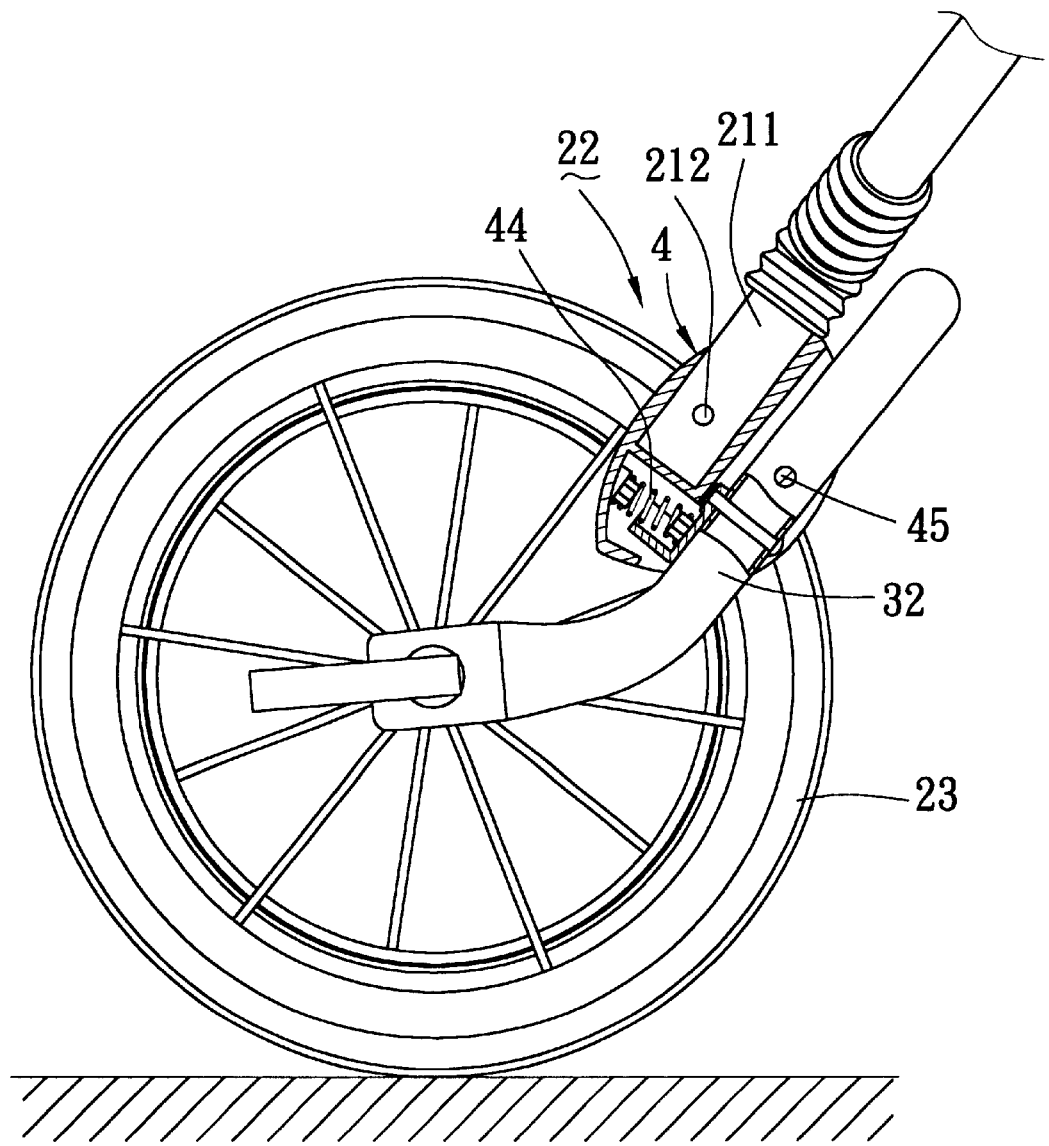
FIG. 7 is an assembled partly sectional schematic side view of the preferred embodiment when subjected to impact transmitted from the front wheel of the stroller.

The biasing members 44 are coil springs, each having proximate and distal ends opposite to each other in the second transverse direction and secured to the mounting wall 41 of a respective one of the coupling members 4 forwardly of the engaged end 2110 of a respective one of the front leg members 211, and to the intermediate portion of a respective one of the lever members 32 proximate to the anchoring end 324. Referring to FIG. 6, when the seat frame 21 is loaded, the biasing members 44 are tensioned. The tensioned biasing members 44 bias the engaged ends 2110 of the left and right front leg members 211 to move towards the intermediate portions of the left and right lever members 32 in the second transverse direction. At the same time, the weight ends of the left and right lever members 32 are brought to abut against the middle portions of the left and right front leg members 211. When the front wheel 23 moves over a rugged surface, the biasing members 44 are compressed. The compressed biasing members 44 bias the engaged ends 2110 of the front leg members 211 to move away from the intermediate portions of the lever members 32 in the second transverse direction, as shown in FIG. 7, thereby counteracting the impact transmitted from the front wheel 23.

The shock absorbing device 22 further includes a pair of anchoring plates 325, each disposed on the intermediate portion of a respective one of the left and right lever members 32 to secure the proximate end of a respective biasing member 44 by means of a rivet 321 passing through a hole in the intermediate portion and a bore in the corresponding anchoring plate 325. A pair of guiding plates 322 extend respectively from the anchoring plates 325 in the second transverse direction and opposed to the engaged ends 2110 of the front leg members 211 in the third transverse direction so as to limit strained movement of the coil springs 44 when the intermediate portions of the left and right lever members 32 are pivoted about the pivoting axis.

Due to the arrangement of the retaining pins, the lever members, together with the coupling members, are detachable from the front leg members to facilitate storage and packaging. Besides, the shock absorbing device is simple in construction.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A shock absorbing device for damping impact transmitted from a front wheel of a stroller which includes a seat frame having front and rear sides opposite to each other in a longitudinal direction, each of the front and rear sides having left and right ends opposite to each other in a first transverse direction relative to the longitudinal direction, the stroller further including a rear wheel axle disposed transverse to the longitudinal direction and having two lateral ends provided with two rear wheels which are rotatable about a first axis parallel to the rear wheel axle, a pair of rear legs each disposed to interconnect a respective one of the two lateral ends and a respective one of the left and right ends of the rear side, and a front wheel axle having two anchored ends and defining a second axis parallel to the first axis, the front wheel being mounted on the front wheel axle and being rotatable about the second axis, said shocking absorbing device comprising:

left and right lever members, each including an anchoring end adapted to be secured to a respective one of the two anchored ends, an intermediate portion extending rearwardly and upwardly from said anchoring end so as to form an upward surface, and a weight end extending from said intermediate portion towards the seat frame;

left and right front leg members, each including an upper end adapted to be connected to a respective one of the left and right ends of the front side, a middle portion extending forwardly and downwardly from said upper end so as to form a downward surface which faces said upward surface of a respective one of said left and right lever members in a second transverse direction, and an engaged end extending from said middle portion towards the front wheel axle;

a pair of coupling members, each including a mounting wall extending in the second transverse direction for positioning said engaged end of a respective one of said left and right front leg members, and a pivoting pin disposed on said mounting wall with a pivoting axis transverse to the second transverse direction for mounting pivotally said intermediate portion of a respective one of said left and right lever members at a fulcrum proximate to said weight end such that a part of said intermediate portion proximate to said anchoring end is spaced apart from said engaged end in the second transverse direction; and a pair of biasing members, each disposed to bias said engaged end of a respective one of said left and right front leg members to move towards or away from said intermediate portion of a respective one of said left and right lever members in the second transverse direction when said biasing member is tensioned or compressed.

2. The shock absorbing device according to claim 1, wherein said weight end of the respective one of said left and right lever members is disposed under said middle portion of the respective one of said left and right front leg members proximate to said upper end so as to be brought to abut against said middle portion when the seat frame is loaded and said engaged end moves away from said intermediate portion.

3. The shock absorbing device according to claim 2, further comprising a cross bar disposed transversely to interconnect and formed integrally with said weight ends of said left and right lever members.

4. The shock absorbing device according to claim 1, wherein said biasing members are coil springs each having proximate and distal ends opposite to each other in the second transverse direction and secured to said mounting wall of the respective one of said coupling members forwardly of said engaged end, and to said intermediate portion proximate to said anchoring end.

5. The shock absorbing device according to claim 4, further comprising a pair of anchoring plates each disposed on said intermediate portion of a respective one of said left and right lever members to secure said proximate end of a respective one of said coil springs, and a pair of guiding plates extending respectively from said anchoring plates in the second transverse direction and opposed to said engaged ends of said left and right front leg members in a third transverse direction relative to the second transverse direction so as to limit strained movement of said coil springs when said intermediate portions of said left and right lever members are pivoted about the pivoting axis.

6. The shock absorbing device according to claim 1, wherein each of said coupling members includes a socket portion formed with said mounting wall and extending in a third axial direction which is parallel to the third transverse direction, said socket portion defining a retaining hole extending radially relative to the third axial direction; and said engaged end includes inner and outer surrounding walls radially opposite to each other and extending in the third axial direction, said inner surrounding wall defining an insert hole extending radially to communicate with said outer surrounding wall such that when said engaged end is positioned by said mounting wall, said retaining hole registers with said insert hole, said engaged end having a spring member disposed therein to bias a retaining pin to move into said retaining hole when said retaining hole registers with said insert hole.

7. The shock absorbing device according to claim 6, wherein said spring member is a leaf spring.

\* \* \* \* \*